Patented July 31, 1945

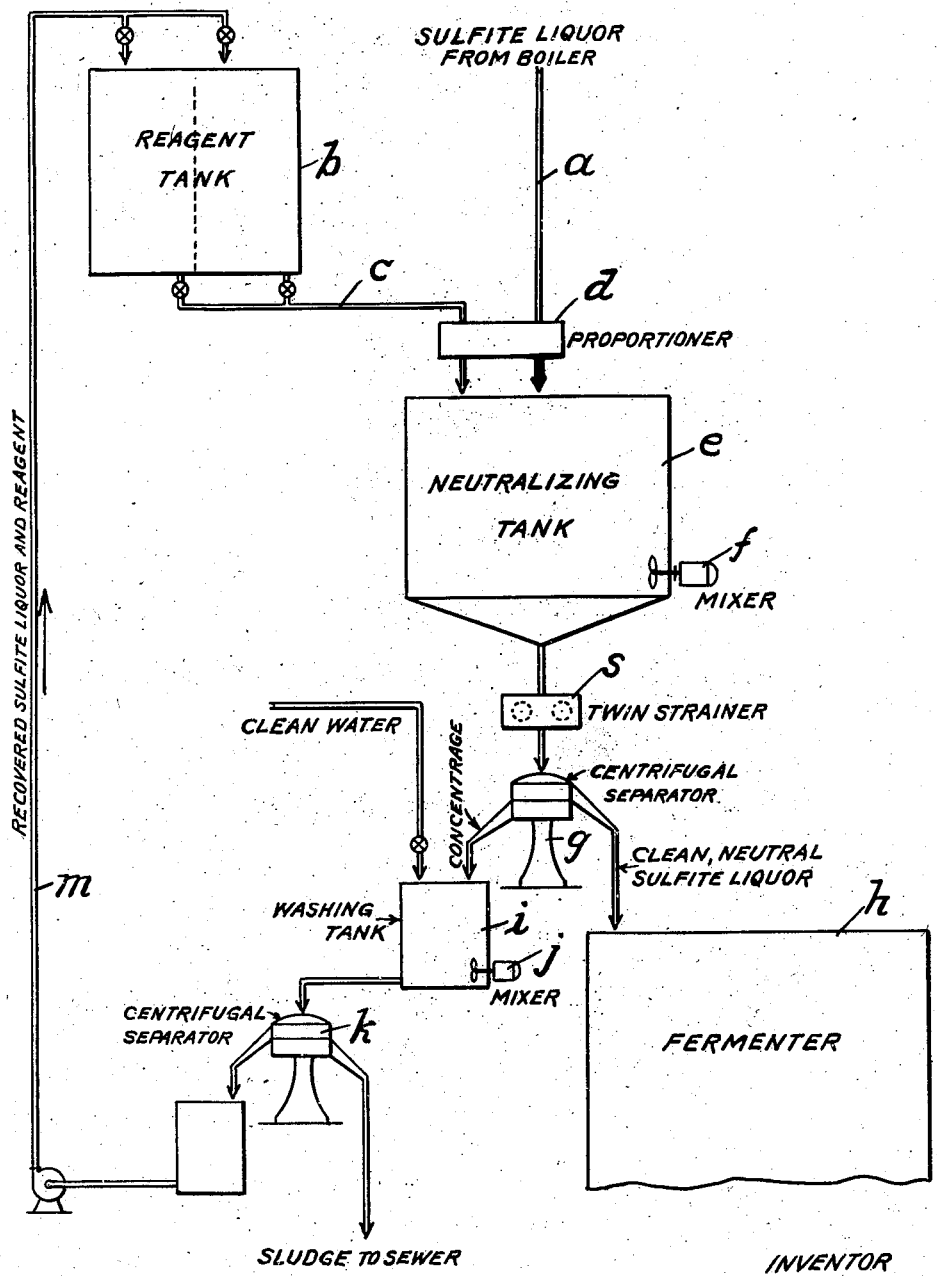

2,380,504

UNITED STATES PATENT OFFICE 2,380,504

PROCESS OF PURIFYING SULPHITE LIQUOR

Gösta Johan Daniel Danielsson, Alsten, Sweden, assignor to The De Laval Separator Company, New York, N. Y., a corporation of New Jersey Application June 26, 1942, Serial No. 448,577
In Sweden June 28, 1941

1 Claim. (Cl. 23—131)

In the manufacture of paper, wood chips are cooked in a chemical solution which reacts with and dissolves the materials that bind the paper-making fibres together. The fibres, which are not dissolved, are drained and washed free of the liquid in which they have been cooked.

The drained liquid from the cooking process, commonly known as sulphite liquor, was formerly considered a waste. It is now subjected to fermentation for the production of alcohol or yeast from the sugars contained therein. Prior to fermentation the sulphite liquor, which is strongly acid, must be neutralized by the introduction of a neutralizing agent, usually lime in finely divided solid form, preferably suspension of the solid in a liquid. To the acid liquor, after leaving the boiler, the neutralizing agent is added, preferably silted up in a liquid in order to facilitate the dosing of the agent. The neutralizing agent contains, besides calcium carbonate or a similar reagent, some insoluble impurities which, as well as undissolved particles of the neutralizing agent, should be removed from the sulphite liquor before it is conveyed to the fermenting tanks. Difficulties would otherwise be caused by the deposit of these matters in the tanks. Heretofore the removal has been effected in gravity separators of some type, usually wooden tanks. These gravity separators, however, occupy a considerable space and are also open to the objection that the settled sludge must periodically be cleaned out, causing delays in production and sometimes clogged pipes.

The objects of the present invention are: to eliminate the objections to gravity settling, to save the undissolved particles of that neutralizing agent and such of the sulphite liquor that, admixed with the impurities, comprise the sludge that must be separated from the sulphite liquor that goes to the fermenting tanks. Further objects and advantages of the process are hereinafter set forth.

The process which comprises my invention may be best understood by reference to the accompanying drawing, which is a flow sheet illustrative of the process.

The sulphite liquor coming from the boiler through line $a$ and the reagent, fed from a tank $b$ through line $c$, are fed to a proportioner $d$ and thence to a neutralizing tank $e$. The latter may be provided with any efficient type of mixer ($f$). The neutralized sulphite liquor is then fed, preferably through a strainer $s$, to a centrifugal separator $g$.

In the centrifugal separator the mixture fed thereto is separated into two parts, namely: clean neutral sulphite liquor, that is, sulphite liquor poor in neutralizing agent, which is in a suitable condition to go to the fermenting tanks, one of which is shown and designated $h$; and a sludge consisting of undissolved neutralizing agent and insoluble impurities in sulphite liquor.

The separated sludge may be led direct to the reagent tank $b$ or to the neutralizing tank $e$. This procedure has two advantages, namely: the undissolved neutralizing agent contained in the purified sludge is recovered for utilization in making the solution of the neutralizing agent which is to react with fresh supplies of sulphite liquor; and the sulphite liquor contained in the purified sludge is saved. But this procedure is open to the objection that the percentage of insoluble impurities in the reagent flowing to the neutralizing tank progressively increases, so that the sulphite liquor in the neutralizing tank becomes enriched, to perhaps an objectionable degree, in insoluble matter. This effect is prevented by conducting the sludge from centrifugal separator $g$ to another centrifugal separator $k$, with, preferably, an intermediate washing with water in a tank $i$, which may advantageously contain a mixer $j$. In the separator $k$ the sulphite liquor and reagent components of the sludge are separated from the insoluble impurities, and the recovered sulphite liquor and reagent are returned through line $m$ to the system at any point preceding the locus of the first centrifugal separation, but it is preferred to return them through line $m$ to the reagent tank $b$, as shown in the drawing. It is possible to effect this last separation by gravity settling, preferably also repeated one or more times. In the latter case, the quantity of the washed sludge from the centrifuge $g$ is so small relative to the quantity of liquor treated in the centrifuge $g$ that very small settling tanks are required.

The centrifugal separation, especially in the first separation, is most advantageously carried out in that well known type of centrifuge which is provided with discharge openings for the concentrate located at a plurality of points around the periphery of the centrifugal bowl, the sludge being discharged with a suitable amount of carrier liquid. The outlet orifices from the discharge channels may be situated at a distance from the rotation axis of the bowl that is greater or less than that of the inlet orifices. Other types of centrifuges may be, somewhat less advantageously, employed. If a centrifuge of the kind described is provided with a suitable strainer device it can be used for fully continuous operation practically without supervision.

For the final concentration of the solid impurities to be removed from the system, different types of centrifuges may be used. For instance, the use of sludge centrifuges of intermittent operation, known as extractors, is entirely practicable; but it is advantageous to use a centrifuge of the type first described. The amount of liquid to be treated in the second centrifuge (k) is comparatively small and the loss of sulphite liquor is insignificant when the sludge from separator g contains only a small proportion of insoluble matter.

In large installations, several centrifuges may work in parallel.

It should be understood that the purified sludge from centrifuge k may be further purified, by renewed centrifuging before removal from the system; or the sludge from centrifuge k may be subjected to gravity settling in a small tank.

It will be understood that, instead of purifying all the sludge from the centrifuge g, part of the sludge might be returned direct to the reagent tank or neutralizing tank. While this procedure per se would not involve the practice of applicant's process, applicant's process would be utilized so long as a large proportion of the sludge is subjected to the washing and second separation step. The only advantage in not purifying all the sludge is some economy of operation.

The advantages of my improved process may be summarized as follows: the production of a clean, neutral sulphite liquor for fermentation; a much more nearly complete removal of the impurities; saving of a substantial proportion of sulphite liquor; the reuse of undissolved reagent; reduction in space required for the entire process as compared with the space required in commercial installations heretofore in use; avoidance of clogging; and continuity of the process when the preferred embodiment thereof is used.

What I claim and desire to protect by Letters Patent is:

The process of treating sulphite liquor which comprises neutralizing the same by continuously treating it with a neutralizing agent, subjecting the neutralized sulphite liquor to centrifugal force to thereby separate a substantially neutral sulphite liquor from a sludge containing sulphite liquor, undissolved neutralizing agent and insoluble impurities, subjecting sludge so centrifugally separated to a washing with water, subjecting sludge so centrifugally separated and washed to a separating operation adapted to remove the major part of the insoluble impurities and any remaining undissolved particles of the reagent carried out therewith from sulphite liquor and dissolved reagent, and returning said separated sulphite liquor and dissolved reagent to the system at a locus preceding the locus of said centrifugal separation, thereby saving sulphite liquor, utilizing undissolved neutralizing agent in the treatment of fresh sulphite liquor and avoiding substantial accumulation of insoluble impurities in sulphite liquor treated with the returned neutralizing agent.

GÖSTA JOHAN DANIEL DANIELSSON.